May 18, 1937.  J. RATHJE  2,080,952

ROTARY TABLE AND DRIVE THEREFOR

Filed Jan. 31, 1935

Witnesses:

Inventor:

Johannes Rathje.

Patented May 18, 1937

2,080,952

UNITED STATES PATENT OFFICE 2,080,952

ROTARY TABLE AND DRIVE THEREFOR

Johannes Rathje, Duisburg, Germany

Application January 31, 1935, Serial No. 4,334
In Germany December 29, 1933

2 Claims. (Cl. 255—23)

This invention relates to improvements in apparatus for operating rotary earth boring drills. In the operation of such drills obstructions frequently cause jamming of the boring tool, and heretofore friction couplings have been employed between the driving means and the drilling stem or rod to absorb shocks caused by the jamming and release of the boring tool. Such couplings require heavy spring pressure to cause the drill to overcome all ordinary obstructions, and when the drill jams the driving means continues to operate by overcoming the friction of the coupling. Through such couplings damaging shocks or impacts are transmitted to the driving mechanism, the causes of which have been overlooked or little understood.

These shocks or impacts transmitted to the gearing result from the twist or torsional energy stored in the rod or rods of the boring system when overcoming obstructions and which is released when the obstruction is overcome or the boring bit is wrenched off of the rod, whereupon the entire drilling rod system rotates at high speed in the direction in which it was operated by the driving mechanism, making this lead movement with a high degree of inertia which cannot be neutralized by a friction coupling.

In accordance with the present invention, the drilling rod is operated through a coupling comprising driving and driven members which engage one another positively, and without slippage, when the drilling rod is being operated by the driving means, but which permit the driven member to over-run the driving member with practically no resistance when the drilling rod, through torsional energy stored therein, gives an advance movement to the driven member. Thus, no damaging shocks are transmitted to the driving mechanism by the jamming and release of the drilling rod. In connection with this means for preventing shocks to the driving mechanism, I may employ a brake which is automatically applied to the latter at the moment when the drilling rod is released and the coupling parts are disengaged, which brake is released as soon as the coupling members attain the same speed and are re-engaged. Also, if desired, a friction coupling can be employed, in addition to the coupling of my invention, the friction coupling responding only to a certain high resistance to the drilling action which will prevent the drilling bit from being wrenched off of the drilling rod.

In the accompanying drawing.

Figure 1:
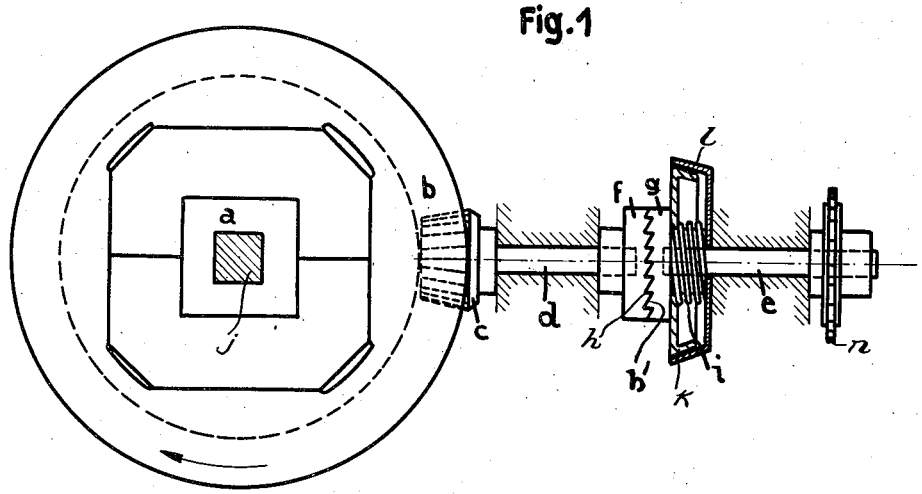
Fig. 1 is a plan view of a rotary table for operating a rotary drill with driving means for the same including a coupling arranged on a two-part driving shaft, and a brake, the latter being shown in section.

In Fig. 1 of the drawing, the rotary table is represented by the ring gear $b$ and carrier $a$, the latter having an axial opening for the reception of the drill rod or stem $j$. The pinion $c$ which is geared to the table is mounted upon a short shaft $d$ and this is connected by a toothed coupling to a driving shaft $e$. One part $f$ of the coupling is secured to the shaft $d$ and the other part $g$ of the coupling is keyed to the shaft $e$ and slidable thereon. A brake member $k$, secured to the coupling member $g$, is arranged within a stationary brake drum $l$ and a spring $i$, arranged between the brake members, normally holds them apart and presses coupling member $g$ into engagement with member $f$. For driving the shaft, a sprocket wheel $n$ is shown upon the part $e$.

The teeth of the coupling members, as shown, have driving surfaces $h$, parallel with the axis of the coupling, which cause operation of the part $f$ without slippage between the parts when the table and drilling rod are being operated by power from the shaft $e$. The teeth also have inclined surfaces $h'$ which permit the part $f$ of the coupling to overrun the part $g$ when and if the part $f$ is driven faster than the part $g$. Thus, if the boring tool jams while the table is being driven in the direction of the arrow, the drill rod will be subjected to a torsional stress, and if the rod is suddenly released the rod will untwist and by its inertia drive the table and the shaft section $d$ and coupling member $f$ momentarily faster than they were being driven by the shaft $e$ at the time of release of the rod. This will turn the coupling member $f$ forward with respect to the member $g$ and no shock will be transmitted to the part $e$ of the drive shaft or to the driving mechanism geared to said part. After the release of the drill rod, when the speed of the coupling member $f$ slows down to the speed of the member $g$, the latter will drive the former positively without slippage, as before. When the part $f$ of the coupling over-runs the part $g$, the latter will be forced away from the former by reason of the camming action of the inclined surfaces of the teeth and the brake member $k$ will be forced against the brake shoe $l$.

This will apply a brake action on the motor mechanism associated with the shaft part e at the moment when the motor is relieved of its load by the release of the drill rod and the over-running of the coupling member f. Owing to the fact that the driving surfaces of the coupling are parallel with its axis, a relatively light spring will hold the coupling members in engagement during normal running, and when the drilling rod, after jamming, is released, the rod may turn the coupling member f forwardly on the member g with very slight opposing resistance.

Figure 3:
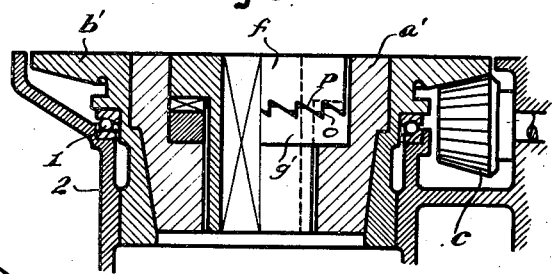
Figure 2:
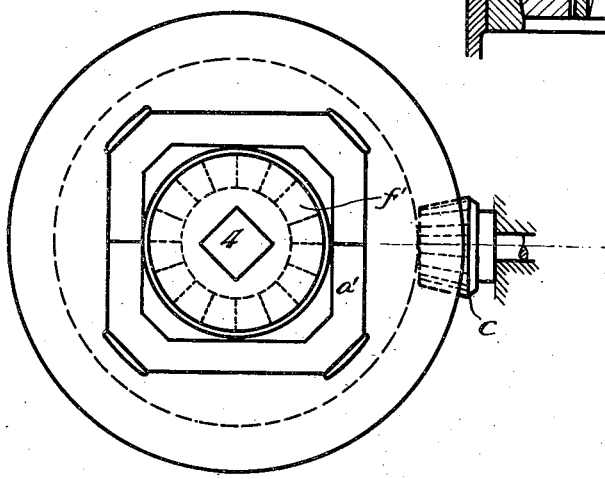
Fig. 2 is a plan view of a rotary table having a coupling within the table, and, Fig. 3 is a central vertical section through a table as in Fig. 2, showing also the mounting for the table.

In Fig. 1, the coupling is arranged on the driving shaft. The coupling may, however, be arranged elsewhere. In Figs. 2 and 3, it is arranged in the central part of the rotatable table. In these views, the gear ring b', mounted in bearings 1 on a casing 2, has secured to it the support or carrier a' for the drill rod, and within a socket in the carrier is secured the driving member g' of the coupling, concentric with the axis of the table. The driven member f' of the coupling rests on the driving member and has an annular opening 4 at its center in which the drill rod is slidable, the rod not being shown in the drawing. The teeth on the coupling members have surfaces o parallel with the axis of the coupling, for causing positive rotation of the member f' by the member g' during the drilling operation, and inclined surfaces p for permitting the member f' to over-run the member g' if the drill stem, after jamming, is released and drives the member f' forwardly by the stored torsional energy in the stem.

What I claim is:

1. In a rotary drilling apparatus, the combination with the stem of a boring tool, of a rotatably mounted table having an axial opening for engagement with the stem, a drive shaft, and a coupling between said shaft and stem, said coupling comprising driving and driven members having parts with surfaces substantially parallel with the axis of the coupling which normally engage one another to cause positive rotation of the stem by the operation of the shaft and with surfaces which permit the driven member to over-run the driving member if the driven member is turned by the torsion of the stem when the boring tool, after jamming, is suddenly released.

2. In a rotary drilling apparatus, the combination with the stem of a boring tool, of a rotatably mounted table having an axial opening for engagement with the stem, a drive shaft, a coupling between said shaft and stem, said coupling comprising driving and driven members having parts with surfaces substantially parallel with the axis of the coupling which normally engage one another to cause positive rotation of the stem by the operation of the shaft and with surfaces which permit the driven member to over-run the driving member if the driven member is turned by the torsion of the stem when the boring tool, after jamming, is suddenly released, a spring normally pressing the driving member toward the driven member, and a brake comprising two members, one secured to the driving member of the coupling so as to move therewith and the other brake member being stationary.

JOHANNES RATHJE.